Figure 1:
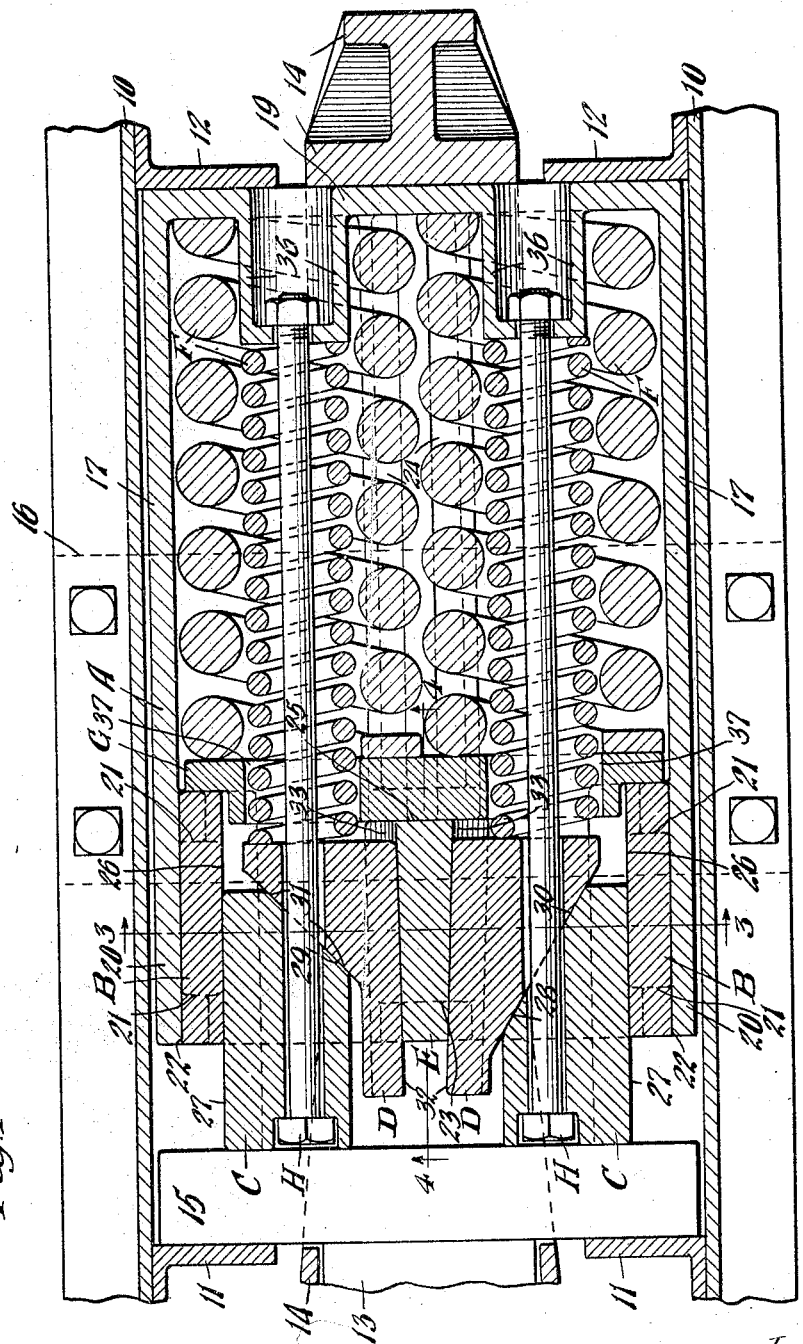

Dec. 25, 1928.  H. FUCHS  1,696,350
FRICTION SHOCK ABSORBING MECHANISM
Filed July 23, 1927   2 Sheets-Sheet 1

Witness
Wm. Geiger

Inventor
Henry Fuchs
By George & Haight
His Atty.

Dec. 25, 1928.                                                1,696,350
H. FUCHS
FRICTION SHOCK ABSORBING MECHANISM
Filed July 23, 1927      2 Sheets-Sheet 2
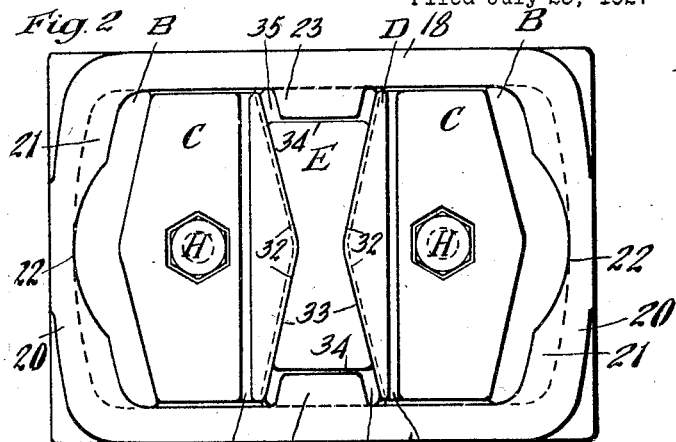
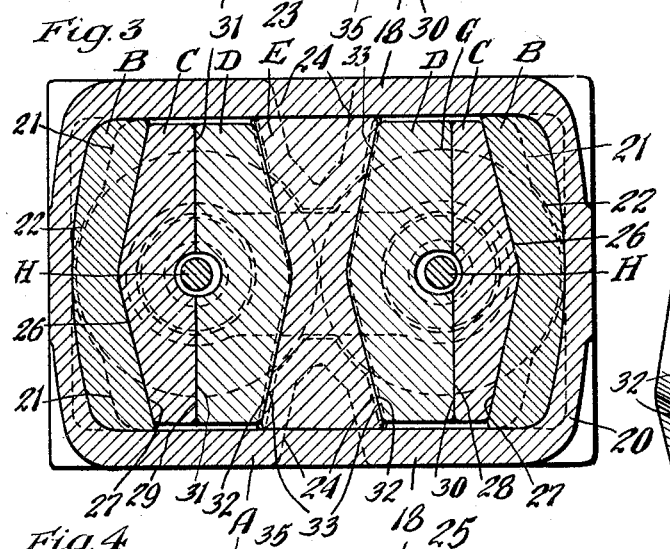
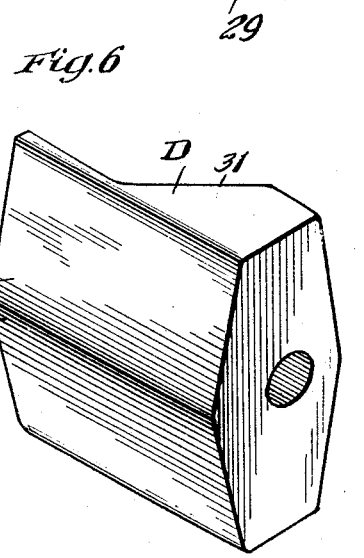
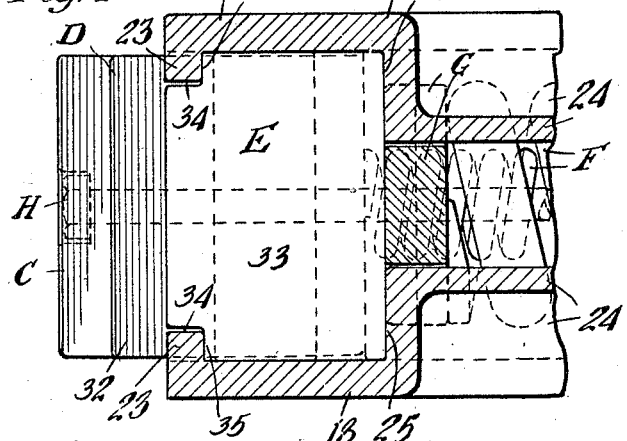
Inventor
Henry Fuchs Patented Dec. 25, 1928.

1,696,350

UNITED STATES PATENT OFFICE.

HENRY FUCHS, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed July 23, 1927. Serial No. 207,865.

This invention relates to improvements in friction shock absorbing mechanisms.

One object of the invention is to provide a friction shock absorbing mechanism, especially adapted for railway draft riggings, of rugged design and high capacity, having large frictional areas provided by a friction shell and post cooperating with a wedge friction means, wherein the friction means is held out of contact with the inactive walls of the shell to prevent wear of the latter, the friction means being so designed as to compensate for unavoidable inaccuracies in manufacture of the members of the friction means.

Another object of the invention is to provide a friction shock absorbing mechanism of the character indicated, including a casing having friction surfaces and a central friction post also provided with friction surfaces together with wedge friction means cooperating with the friction surfaces of the post and casing, the friction means including a plurality of elements having wedging engagement with each other, wherein the cooperating friction surfaces of the friction means, post and casing interengage to limit relative movement of the parts to a direction lengthwise of the mechanism to maintain the friction means out of contact with the inactive walls of the casing to prevent wear of said walls, and wherein the cooperating wedge faces of the friction means present plain flat surfaces so that the parts will accommodate themselves for slight inaccuracies of the interengaging friction surfaces, such as are unavoidable under the usual manufacturing conditions.

Other objects of the invention will more clearly appear from the description and claims hereinafter following.

In the drawings, forming a part of this specification, Figure 1 is a horizontal, longitudinal sectional view of a portion of a railway draft rigging illustrating my improvements in connection therewith. Figure 2 is a front end elevational view of the shock absorbing mechanism proper. Figure 3 is a transverse, vertical sectional view corresponding substantially to the line 3—3 of Figure 1. Figure 4 is a longitudinal, vertical sectional view of the forward end portion of the shock absorbing mechanism proper, corresponding substantially to the line 4—4 of Figure 1. And Figures 5 and 6 are detail perspective views of a wedge block and a friction shoe employed in connection with my improved mechanism.

In the drawings, 10—10 indicate the usual channel shaped center or draft sills of a railway car underframe, to the inner sides of which are secured front stop lugs 11—11 and rear stop lugs 12—12 of well known form. The rear end portion of the draw bar is indicated by 13, to which is operatively connected a yoke 14. The shock absorbing mechanism proper and a front main follower 15 are disposed within the yoke. The yoke and the parts therewithin are supported in operative position by a saddle plate 16 detachably secured to the draft sills 10.

My improved shock absorbing mechanism proper comprises broadly, a casing A; a pair of liners B—B; two wedge blocks C—C; two friction shoes D—D; a central friction post E; twin arranged spring resistance elements F—F; a spring follower G; and a pair of retainer bolts H—H.

The casing A is in the form of a substantially rectangular box-like casting having longitudinally extending spaced vertical side walls 17—17, horizontally disposed longitudinally extending spaced top and bottom walls 18—18 and a vertical transverse rear end wall 19. The end wall 19 cooperates with the stop lugs 12 in the manner of the usual rear follower. At the forward end the side walls of the casing A are thickened, as indicated at 20, the thickened portions 20 being cut out centrally to provide front and rear abutment ribs 21—21 serving as holding means for the liners B. As most clearly shown in Figure 2, the front pair of ribs 21 are centrally cut away between the top and bottom sides thereof, as indicated at 22 to permit insertion of the spring resistance elements F into the casing A, as hereinafter more clearly explained. At the forward end of the casing A, the top and bottom walls 18 thereof are provided with inwardly projecting retaining lugs 23—23 which cooperate with the friction post E to limit outward movement thereof. The top and bottom walls 18 of the casing A are also provided with longitudinally extending interior ribs 24—24 extending from the rear end of the casing toward the front end thereof and terminating at a point substantially in alignment with the inner ends of the inner set of lugs 21. The front end portions of the ribs 24 present flat abutment surfaces 25, which cooperate with the inner end of the post E to hold the same against movement inwardly of the casing A. In addition to serving as abutment means for the post E, the ribs 24 also serve to hold the twin springs F separated and in proper position.

The liners B are secured to the opposite side walls of the casing A. The two liners B are of similar design, each being in the form of a relatively thick substantially rectangular plate having a longitudinally disposed inner friction surface 26 of V-shaped section, as most clearly shown in Figures 2 and 3. On the outer side each liner B is cut away at the front and rear ends thereof to accommodate the retaining ribs 21 of the casing A. When the liners B are in position, as most clearly shown in Figure 1, the ribs 21 positively prevent longitudinal movement of the liners with respect to the casing A to hold the same anchored to the casing. As illustrated in the present disclosure of the invention, the friction surfaces 26 of the opposed liners are parallel to the longitudinal axis of the mechanism, but it will be evident that the same may be arranged so as to converge inwardly of the mechanism.

The pressure transmitting wedge blocks C are disposed at opposite sides of the mechanism and are of similar design, except as hereinafter pointed out. Each of the wedge blocks C is provided with a transverse flat front end face bearing directly on the inner side of the main follower 15. On the outer side each block C is provided with a longitudinally disposed friction surface 27 of V-shaped section so as to interfit with the corresponding friction surface 26 of the liner B with which the wedge block cooperates. At the inner end each block C is provided with a wedge face, the wedge face of one of the blocks being designated by 28 and that of the other block being designated by 29. As will be clear upon reference to Figure 1, the wedge face 28 is disposed at a keener angle with respect to the longitudinal axis of the mechanism than the wedge face 29.

The friction shoes D, which are also of similar design, except as hereinafter pointed out, are disposed at opposite sides of the mechanism and cooperate with the wedge blocks C—C. Each of the friction shoes is provided with a flat rear end face adapted to cooperate with one of the twin arranged spring resistance elements F. On the outer side each shoe D is provided with a wedge face cooperating with one of the wedge blocks C, the wedge face of the shoe D which cooperates with the wedge face 28 of one of the blocks C being designated by 30 and that of the other block which cooperates with the wedge face 29 being designated by 31. The wedge faces 30 and 29 are correspondingly inclined to the wedge faces 28 and 26 respectively, so as to properly cooperate therewith. On the inner side each friction shoe D is provided with a longitudinally disposed friction surface 32. The friction surfaces 32 are of V-shaped section as most clearly shown in Figures 2, 3 and 6. When the parts are in their assembled position, the opposed friction surfaces 32 of the friction shoes diverge inwardly of the mechanism.

The friction post E is in the form of a relatively heavy rectangular plate having friction surfaces 33—33 on the opposite sides thereof. The friction surfaces 33 are of V-shaped section and interfit with the friction surfaces 32 of the friction shoes D. As clearly shown in Figure 1, the friction post or plate E is tapered and the friction surfaces 33 on the opposite sides thereof diverge inwardly of the mechanism. At the forward end the top and bottom edges of the friction post E are cut away as indicated at 34, thereby presenting vertical abutment faces 35 adapted to engage in back of the lugs 23 on the top and bottom walls of the casing A. The main body portion of the post E is of such a size as to accurately fit between the lugs 23 and the abutment shoulders 25 of the casing. The cooperating lugs 23 and abutment shoulders 25 serve to prevent longitudinal movement of the post with respect to the casing but permit free lateral displacement thereof to a limited extent.

The twin arranged main spring resistance elements F—F comprise two members disposed at opposite sides of the mechanism, each member including an inner spring and a relatively heavier outer coil spring. The rear ends of the outer coils of the two twin arranged spring elements bear directly on the end wall 19 of the casing A, and the front ends of these coils bear directly on the inner side of the spring follower G. The inner coils of the two spring elements have their rear ends bearing on inwardly projecting hollow bosses 36 formed integral with the end wall 19 of the casing. The forward ends of the inner coils of the springs bear directly on the inner ends of the friction shoes D—D, the spring follower G being recessed as indicated at 37 to freely accommodate the front end portions of the inner coils of said spring resistance elements.

The spring follower G is in the form of a substantially flat plate-like member corresponding in outline to the open end portion of the casing A, so that the same may be freely inserted through the open end of the casing when the liners B are removed. The front surface of the spring follower G bears directly on the inner ends of the liners B, thus limiting outward movement of the spring follower. The central portion of the spring follower is thickened as most clearly shown in Figure 1 so that the same will bear directly on the inner end of the friction post E when the parts are in their full release position.

The mechanism is held of uniform overall length and in assembled relation by the two retainer bolts H. The retainer bolts H as clearly shown in Figures 1, 2 and 3 are disposed at opposite sides of the mechanism and have their shanks extending through longitudinal openings provided in the wedge blocks C and the friction shoes D. Each wedge block C is provided with a recess at the outer end thereof adapted to accommodate the head of the corresponding bolt. The nuts of the bolts H are disposed within the hollow bosses 36 at the rear end of the casing A and serve to hold the parts anchored. As will be seen upon reference to Figure 1, the bolt openings in the wedge blocks and friction shoes are of such a size as to permit a certain amount of lateral displacement of the parts wthout binding the bolts. In addition to holding the parts assembled, the bolts also serve to maintain the spring resistance elements F under initial compression. Inasmuch as the central coils of the twin spring resistance elements F are under initial compression, the tendency of the same to expand will compensate for wear of the various friction and wedge faces of the mechanism by urging the friction shoes D outwardly against the wedge faces of the blocks C. The tendency of the inner coils of the springs to expand also serves another purpose, namely, that of holding the liners assembled with the casing A by forcing the wedge blocks C laterally outwardly due to the wedging engagement between these blocks and the friction shoes D.

In assembling the mechanism the twin spring resistance elements F are inserted into the casing through the open end thereof before the liners B are placed in position, the cut away portions 22 of the ribs 21 permitting the free insertion of these elements. The spring follower G is then placed in position and the two liners anchored to the side walls of the casing A by disposing the main body portions of the liners between the ribs 21—21. With the parts thus far assembled it will be seen that the spring follower G is held against outward movement by engagement of the liners B. The friction post E is next placed in position by disposing the main body portion there between the lugs 23 and the abutment surfaces 25 of the ribs 24. The friction shoes D—D and the wedge blocks C—C are next placed in position and secured by the anchoring retainer bolts H.

The operation of my improved shock absorbing mechanism, assuming a compression stroke, is as follows: The main follower 15 and the casing A will be moved relatively toward each other, thereby forcing the wedge blocks C inwardly of the casing A along the friction surfaces of the liners B. Due to the keen angle wedging faces 28 and 30 of one set of cooperating wedge blocks and friction shoes, a wedging action will be set up during the compression of the mechanism forcing the friction shoes D into intimate contact with the friction surfaces of the post E and the friction surfaces of the wedge blocks C into intimate contact with the friction surfaces of the liners B. As the compression stroke progresses, the friction shoes D will be forced inwardly of the friction surfaces of the post E, causing compression of the central coils only of the twin arranged spring resistance elments F during the first part of the compression stroke. As clearly shown in Figure 1, the inner ends of the friction shoes D are normally spaced from the front face of the spring follower G. When the clearance between the friction shoes F and the follower G is taken up, the follower G will be forced rearwardly in unison with the friction shoes D, thus effecting compression of the outer coils of the spring resistance elements F also. The described compression stroke of the mechanism continues either until the actuating force is reduced or the spring follower is limited in its movement by engagement with the casing A. Upon engagement of the casing A by the follower 15, the actuating force is transmitted directly through the casing A, the latter acting as a solid column load transmitting member to prevent undue compression of the main spring resistance F.

During release of the mechanism, when the actuating force is reduced, the expansive action of the spring resistance elements F forces the parts outwardly. During the first part of the releasing action, the spring follower G, friction shoes D and wedge blocks C will be carried outwardly substantially in unison until movement of the spring follower G is positively limited by engagement with the inner ends of the liners B, whereupon the further expansion of the central coils of the spring resistance elements F will force the friction shoes D to their outermost position. The extreme outward movement of the friction shoes D is determined by the retainer bolts H which limit the outward movement of the wedge blocks C.

The releasing action of the mechanism is greatly facilitated by the arrangement of the blunt wedge faces 26 and 29 of the one pair of cooperating wedge blocks and friction shoes. In addition to facilitating release of the mechanism, these blunt wedge faces also serve another function during the compression stroke, that is, of accommodating the necessary lateral movement of the friction shoes D due to the diverging relation of the cooperating friction surfaces of the post and shoes. It will be evident that during the compression stroke of the mechanism, due to the diverging relation of the outer surfaces of the friction post, the friction shoes D will be forced apart. Inasmuch as the keen wedge faces 28 and 30 will not accommodate this lateral displacement, the friction post E and the friction shoe D having the blunt wedge face are displaced laterally, movement of the post E laterally being permitted due to the manner in which it is mounted between the lugs 23 and the abutment surfaces 25 of the casing A.

From the preceding description taken in connection with the drawings, it will be evident that due to the friction surfaces of the liners, shoes, wedge blocks and posts being of V-shaped section, the parts of the friction means are limited to movement in a direction longitudinal of the mechanism and are prevented from dragging on the top and bottom walls of the casing. As hereinbefore pointed out, the cooperating wedge faces of the wedge blocks and friction shoes are plain so that the shoes and wedge blocks may be displaced to a limited extent vertically with respect to each other without interfering with the proper face contact between these parts.

In the construction of the mechanisms of the character herein described, slight inaccuracies often occur in the contour of the friction surfaces and wedge faces which are unavoidable under the usual manufacturing conditions. It will be evident that when such inaccuracies occur and the cooperating wedge faces of the friction shoes and wedge blocks are also made so as to interfit, a relative displacement of the parts might occur which would permit proper contact between either the cooperating wedge faces or the cooperating friction surfaces. By providing the plain flat wedge surfaces, as hereinbefore pointed out, entire amount of displacement necessary is taken care of to accommodate the parts to inaccuracies due to manufacturing conditions.

While I have herein shown and described the preferred manner of carrying out my invention, the same is merely illustrative, and I contemplate all changes and modifications which come within the scope of the claims appended hereto.

I claim:

1. In a friction shock absorbing mechanism, the combination with a casing having a pair of longitudinally disposed interior friction surfaces; a central friction post within the casing; friction elements having friction surfaces cooperating with the friction surfaces of the casing, said elements being slidable lengthwise of the casing; additional friction elements having wedging engagement with the first named friction elements and frictional engagement with the post, said additional friction elements being movable relatively to the post lengthwise of the mechanism, the cooperating wedge faces of said first named and additional elements being such as to accommodate the relative displacement of the first named and additional elements vertically, said cooperating friction surfaces of the mechanism being formed to confine all of said elements to movement longitudinally of the casing only; and spring resistance means opposing relative movement of the casing and additional elements.

2. In a friction shock absorbing mechanism, the combination with a casing having a friction shell section at the forward end thereof presenting opposed interior friction surfaces; of a central friction post anchored to the casing against longitudinal movement with respect thereto; a spring resistance within the casing; a pair of friction shoes disposed on opposite sides of the post and having friction surfaces cooperating with the friction surfaces of the post; a pair of wedge pressure transmitting members interposed between the friction shoes and friction surfaces of the shell, said wedge members and shoes having interengaging wedge faces permitting displacement of the shoes and wedge members both longitudinally and laterally of the mechanism, the friction surfaces of the shoes interengaging the friction surfaces of the wedge pressure transmitting members, and the friction surfaces of the friction shoes interengaging the friction surfaces of the post, and limiting movement of the shoes and wedge pressure transmitting members to a direction lengthwise of the casing.

3. In a friction shock absorbing mechanism, the combination with a friction shell having opposed interior V-shaped friction surfaces; of a central friction post within the shell having V-shaped friction surfaces on the opposite sides thereof; a pair of friction shoes having V-shaped friction surfaces cooperating with said post friction surfaces; a pair of wedge blocks having V-shaped friction surfaces cooperating with the V-shaped friction surfaces of the shell, said wedge blocks and shoes having interengaging plain wedge faces; and spring resistance means opposing inward movement of the shoes.

4. In a friction shock absorbing mechanism, the combination with a casing of substantially rectangular cross section, said casing being provided with interior friction surfaces on the opposite sides thereof; a central friction post anchored to the casing; a pair of friction shoes having friction surfaces cooperating with the post friction surfaces; wedge blocks having friction surfaces engaging the shell friction surfaces, said wedge blocks and shoes having cooperating wedge faces permitting relative movement of said shoes and wedge blocks in all directions in a single plane, the cooperating friction surfaces of said wedge blocks and the shell friction surfaces and the cooperating surfaces of the shoes and friction post being of interengaging guide and groove formation to limit movement of the shoes and wedge blocks to a direction longitudinal of the mechanism; and spring resistance means yieldingly opposing inward movement of the shoes.

5. In a friction shock absorbing mechanism, the combination with a friction shell having opposed interior V-shaped friction surfaces; of a pair of pressure transmitting wedge blocks having V-shaped friction surfaces cooperating with the friction surfaces of the shell; a central friction post having inwardly diverging friction surfaces of V-shaped section on the opposite sides thereof; a pair of friction shoes cooperating with the friction surfaces of the post and having the same formed of V section to interfit with the friction surfaces of the post, said friction shoes and wedge blocks having cooperating wedge faces permitting relative displacement of the friction shoes and wedge blocks to permit alignment of the interfitting V-shaped friction surfaces of the mechanism; and a spring resistance yieldingly opposing inward movement of the shoes.

In witness that I claim the foregoing I have hereunto subscribed my name this 20th day of July, 1927.

HENRY FUCHS.